(12) United States Patent
Pigeon (10) Patent No.: US 8,856,101 B2
(45) Date of Patent: Oct. 7, 2014

(54) INTERACTIVE MEDIA CARD

(71) Applicant: Normand Pigeon, Cookshire-Eaton (CA)

(72) Inventor: Normand Pigeon, Cookshire-Eaton (CA)

( * ) Notice: Subject to any disclaimer, the term of this patent is extended or adjusted under 35 U.S.C. 154(b) by 0 days.

(21) Appl. No.: 13/647,627

(22) Filed: Oct. 9, 2012

(65) Prior Publication Data

US 2013/0097147 A1 Apr. 18, 2013

Related U.S. Application Data

(60) Provisional application No. 61/547,242, filed on Oct. 14, 2011.

(51) Int. Cl.
*G06F 7/00* (2006.01)
*G06F 17/30* (2006.01)

(52) U.S. Cl.
CPC ............................. *G06F 17/30864* (2013.01)
USPC ........................................................ 707/706

(58) Field of Classification Search
USPC ........................................................... 717/107
See application file for complete search history.

(56) References Cited

U.S. PATENT DOCUMENTS

| | | | | |
|---|---|---|---|---|
| 5,544,302 | A * | 8/1996 | Nguyen | 715/837 |
| 8,041,765 | B1 * | 10/2011 | Krishnaswamy et al. | 709/204 |
| 8,306,506 | B1 * | 11/2012 | Swan | 455/412.1 |
| 2002/0138470 | A1 * | 9/2002 | Zhou | 707/3 |
| 2003/0069874 | A1 * | 4/2003 | Hertzog et al. | 707/1 |
| 2005/0283497 | A1 * | 12/2005 | Nurminen et al. | 707/104.1 |
| 2006/0293903 | A1 * | 12/2006 | Ramanathan et al. | 705/1 |
| 2008/0033919 | A1 * | 2/2008 | Arrouye et al. | 707/3 |
| 2008/0033957 | A1 * | 2/2008 | Forstall et al. | 707/9 |
| 2009/0254971 | A1 * | 10/2009 | Herz et al. | 726/1 |
| 2009/0271762 | A1 * | 10/2009 | Taylor et al. | 717/107 |
| 2010/0081419 | A1 * | 4/2010 | Chiang et al. | 455/416 |
| 2010/0161582 | A1 * | 6/2010 | Spohr et al. | 707/706 |
| 2010/0198854 | A1 * | 8/2010 | Chitturi et al. | 707/760 |
| 2010/0203873 | A1 * | 8/2010 | Elleouet et al. | 455/414.4 |
| 2010/0255861 | A1 * | 10/2010 | Raviv et al. | 455/466 |
| 2010/0331043 | A1 * | 12/2010 | Chapman et al. | 455/556.1 |
| 2011/0047246 | A1 * | 2/2011 | Frissora et al. | 709/219 |
| 2011/0090402 | A1 * | 4/2011 | Huntington et al. | 348/564 |
| 2011/0127326 | A1 * | 6/2011 | Daigle et al. | 235/380 |
| 2011/0294425 | A1 * | 12/2011 | Coffing | 455/41.2 |
| 2012/0072853 | A1 * | 3/2012 | Krigstrom et al. | 715/748 |
| 2012/0087537 | A1 * | 4/2012 | Liu et al. | 382/100 |
| 2012/0094626 | A1 * | 4/2012 | Kim et al. | 455/403 |
| 2012/0173358 | A1 * | 7/2012 | Soroca et al. | 705/26.3 |
| 2012/0197871 | A1 * | 8/2012 | Mandel et al. | 707/722 |
| 2012/0197967 | A1 * | 8/2012 | Sivavakeesar | 709/203 |
| 2012/0296838 | A1 * | 11/2012 | van der Nol | 705/319 |
| 2013/0036117 | A1 * | 2/2013 | Fisher et al. | 707/736 |
| 2013/0097253 | A1 * | 4/2013 | Mencke | 709/206 |
| 2013/0246418 | A1 * | 9/2013 | Bergin | 707/736 |

* cited by examiner

*Primary Examiner* — Robert Beausoliel, Jr.
*Assistant Examiner* — Nicholas Allen
(74) *Attorney, Agent, or Firm* — Freedman & Associates (57) ABSTRACT

A method for creating and searching within an entity-defined profile is disclosed. A search engine is provided for searching within first data for data meeting known criteria. The search engine receives criteria data comprising a first media card. The media card relates to an individual or organization. Result data associated with the criteria data is retrieved, the result data associated with at least some data within the first media card to provide search results, and then the search results are displayed.

25 Claims, 5 Drawing Sheets

INTERACTIVE MEDIA CARD

FIELD OF THE INVENTION

The present invention relates generally to electronic business cards and more particularly to interactive media cards.

BACKGROUND

The business card is commonly used to exchange business contact information between business associates. The present form of the business card is relatively standardized and is used in Rolodexes and in electronic equivalents the world over. Advantageously, a business card includes contact information for people you meet and is easily and conveniently carried and exchanged.

Unfortunately, in today's business world, many introductions and other exchanges happen electronically or by voice communication wherein a business card cannot be readily exchanged. To this end, electronic business cards, or vCards, have been developed. A vCard is an electronic business card comprising contact information for an individual. Though many applications export vCards, they have yet to be standardized such that all electronic contact systems import them. Further, the inclusion of contact information within a vCard has been standardized on the lowest common denominator—the minimum information set for an individual's contact information, instead of benefiting from the wide array of contact mechanisms available to businesses today.

It would be advantageous to provide a system and method for electronically sharing business contact information that overcomes at least some of the limitations of the prior art.

SUMMARY OF EMBODIMENTS OF THE INVENTION

According to at least one embodiment of the instant invention there is provided a method comprising storing first data on a first server, the first data comprising first a media card, the first media card when displayed via a display portion of a computer providing a visual representation of a subset of data within a capsule associated with a first individual for distribution of data from within the capsule; transmitting via a communication network from the first server the first data to an input port of a search engine, the first data provided as search criteria for the search engine; receiving the first data via the input port by the search engine; using the search engine, searching within second data different than the first data, for first result data based on the first data; and displaying, via a display portion of a first computer, search results based on the first result data.

According to at least one embodiment of the instant invention there is also provided a method comprising providing a search engine in execution on a first computer for searching within first data for result data; receiving, by the search engine, criteria data comprising first media card data; searching, by the search engine, for the result data associated with the criteria data within the first data, the result data associated with at least some data within the first media card to provide search results; and displaying the search results on a user interface.

According to at least one embodiment of the instant invention there is also provided a method comprising providing a search engine in execution on a first computer for searching within first data for result data; receiving, by the search engine, criteria data comprising first media card data and a Boolean operator; searching by the search engine for the result data associated with the criteria data within the first data, the result data associated with at least the Boolean operator applied to the first media card data to provide search results; and displaying the search results on a user interface.

According to at least one embodiment of the instant invention there is also provided a method providing a search engine in execution on a first computer for searching data within a user specified data store for result data; the user specified data store comprising first media card data; receiving, via a first media card interface, criteria data comprising second media card data; searching by the search engine for result data associated with the criteria data within the user specified data store, the result data associated with at least the first media card data to provide search results; and displaying the search results on a user interface.

According to at least one embodiment of the instant invention there is also provided a method providing a search engine in execution on a first computer for searching data within a user specified data store for result data; the user specified data store comprising first media card data; receiving, via a first media card interface, criteria data comprising second media card data and a Boolean operator; searching for result data associated with the criteria data, the result data associated with at least the Boolean operator applied to the second media card data, to provide search results; and displaying the search results on a user interface.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Throughout the detailed description and in the appended claims, the following terms are to be accorded the following definitions:

Entity—is for example a person, an end user, or a company. Additionally, an entity includes a product or service.

Capsule—as used herein is defined as a grouping of data relating to a same entity and comprising data indicating at least two different data stores wherein further data associated therewith is stored. Capsule data comprises data stored within the capsule and the data in the indicated different data stores.

Media card—as used herein is defined as a visual representation of at least a subset of data within the capsule for use in distribution of data from within the capsule. Typically the entity defines the media card to have relatively consistent visual representation of the at least a subset of data within the capsule.

Recipient—is defined as a person viewing and accessing capsule data via a media card.

Figure 1:
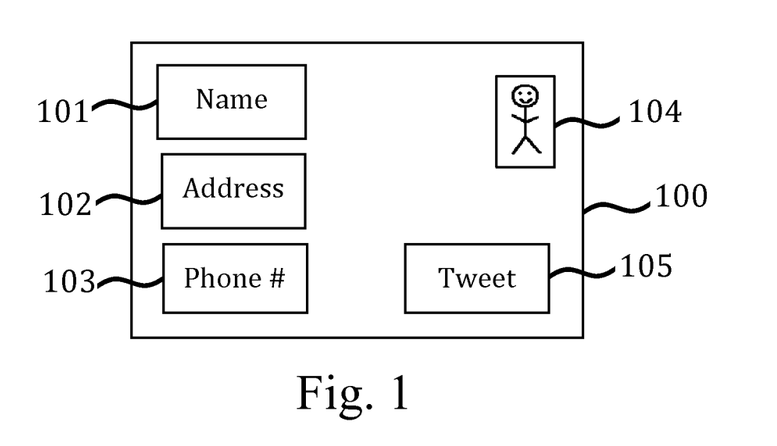
FIG. 1 illustrates a client media card.

According to an embodiment of the invention, FIG. 1 illustrates media card 100, defined for an entity in the form of a businessman and provides recipients in the form of clients access to data in media card 100. Media card 100 comprises the businessman's name 101, address 102, phone number 103, photo 104, and latest Twitter® tweet 105. The businessman sends an email to a client with media card 100 attached. The client's email reader is compatible with media card 100 and the client opens media card 100 by selecting the media card icon embedded within the email. The media card interactive interface is displayed and the client views the information listed above.

Optionally, the businessman utilizes the media card as a marketing tool, wherein the media card interface is uniquely designed for communicating the businessman's corporate image and branding message. For example, the media card interface displays the data shown in FIG. 1 as well as a corporate logo, key marketing messaging, and a list of his services. Occasionally, key market messaging is updated, however the media card's look in general remains consistent. This consistency helps his clients to identify him with the image he wishes to portray via the media card interface. Alternatively the media card is viewed within an email. Alternatively, selecting a media card icon launches a website wherein the media card is displayed. Alternatively, a media card URL is provided in an email and when selected launches a website wherein the media card is displayed. Alternatively, the media card is embedded in an online document accessible via a web link.

Optionally, the device on which the media card is viewed determines the media card functionality. For example, the media card when viewed on a mobile phone provides the optional functionality of automatically dialing the businessman's phone number when the recipient selects the businessman's phone number displayed on the media card interface. Another example, the media card when viewed on a laptop or other computer provides the optional functionality of automatically launching a new email addressed to the businessman when the recipient selects the businessman's email address displayed on the media card interface.

Figure 2:
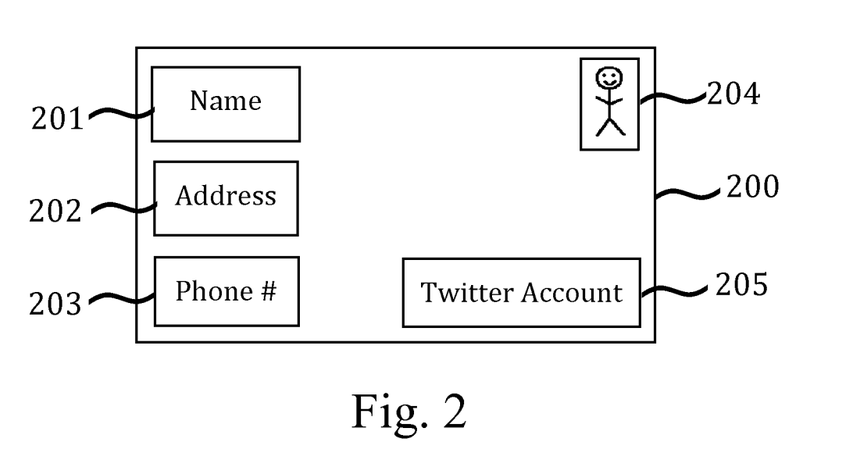
FIG. 2 illustrates a capsule.

FIG. 2 illustrates capsule 200 defined by the businessman which comprises data relating to the businessman's name 201, address 202, phone number 203, photo 204, and a link to the businessman's latest Twitter® tweet 205. The businessman selected all data in capsule 200 to be visible on media card 100. Optionally, capsule data indicates data sources, for example social media websites. Further optionally, capsule data indicates the businessman's email. Further optionally, capsule data comprises URL links to websites usernames, passwords, and so forth. Alternatively, the entity is a corporation.

Figure 3:
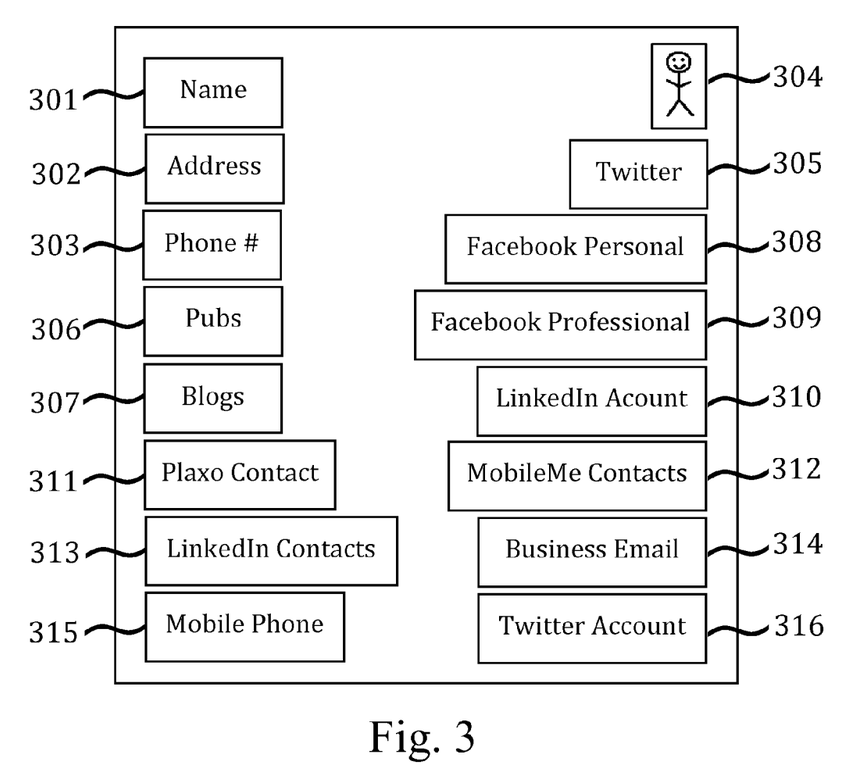
FIG. 3 illustrates a modified capsule.
Figure 4:
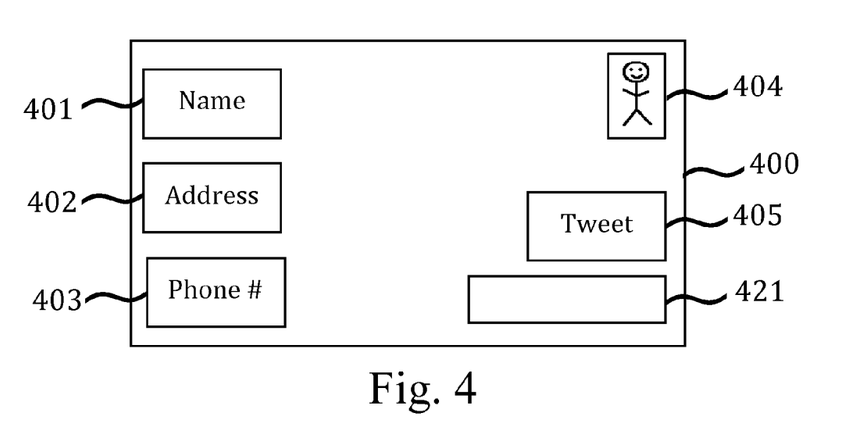
FIG. 4 illustrates a modified client media card.

According to an embodiment of the invention a media card comprises a subset of associated capsule data. FIG. 3 shows capsule 300 comprising a businessman's name 301, address 302, phone number 303, picture 304 and latest Twitter® tweet 305. Capsule 300 also comprises personal and professional data relating to publications 306, blogs 307, a link to the businessman's Facebook® personal profile 308, a link to the businessman's Facebook® business profile 309, a link to the businessman's LinkedIn® account 310, Plaxo® contacts 311, MobileMe® contacts 312, business email 314, Twitter® account 316, and Mobile phone number 315. Typically at least some of the external data is included via links or pointers thereto as opposed to being imported. Illustrated in FIG. 4 is media card 400 associated with capsule 300. Capsule 300 data selected for viewing via interactive interface of media card 400 includes the businessman's name 301, address 302, phone number 303, picture 304 and latest Twitter® tweet 305. Capsule 300 data selected to be accessible via media card 400 includes information in publications 306, Facebook® business profile 309 and LinkedIn® profile 310. When viewed by the client a first portion of the capsule data is displayed on the media card's interactive interface, comprising the businessman's name 401, address 402, phone number 403, photo 404, latest Twitter® tweet 405, and search box 421. A second portion of the capsule data is accessible to the client via a search box displayed on the interactive interface, comprising publications 406, older Tweets 405, Facebook® business profile 409, and LinkedIn® profile 410. For example, a client wishes to determine if the businessman has received any professional awards, and types keywords "awards achievements" in the search box 421. All data selected for media card 400 is searched for information relating to the keywords, including online Facebook business profile 309 and online LinkedIn® profile 310. Related data is retrieved and is displayed for the client on the media card interface. A third portion of capsule data comprising blogs 307, Facebook® personal profile 308, Plaxo® contacts 311, MobileMe® contacts 312, Linkedin® contacts 313, business email 314, and Twitter® account 316, mobile phone number 315 are not viewable, accessible or searchable by the client as these data sources were not selected for media card 400.

Optionally, a media card is forwardable in an email. Optionally a media card is viewed on a mobile device; for example, the media card is formatted for viewing on said mobile device. Alternatively the media card is viewed within an email, for example in a signature portion thereof. Further alternatively, selecting a media card icon launches a website wherein the media card is displayed. Alternatively, the media card is embedded in an online document accessible via a web link. Even further alternatively, a keyword is highlighted when the recipient's mouse hovers over the keyword and is searched for when the keyword is selected.

Alternatively, related data resulting from a data search is displayed other than in the media card interface. Further alternatively, related data resulting from a data search is displayed in a new window. For example, a client wishes to determine if the businessman has received any professional awards, and types keywords "awards achievements" in the search box. All data selected for media card 400 is searched for information relating to the keywords, including online Facebook business profile 309 and LinkedIn® profile 310. Related data is retrieved, and a separate window outside the media card interface is launched and is displayed for the client.

Alternatively, keywords are typed into other than the media card interface. For example, keywords are typed into a webpage. For example, a client wishes to determine if the businessman has received any professional awards, and selects a "search" button of the media card interface. A webpage is launched and the client types keywords "awards achievements" in the search box. All data selected for media card 400 is searched for information relating to the keywords, including online Facebook business profile 309 and online LinkedIn® profile 310. Related data is retrieved, and displayed on the webpage.

Optionally, the device on which the media card is viewed determines the media card functionality and/or format. For example, the media card when viewed on a mobile phone provides the optional functionality of automatically dialing the businessman's phone number when the recipient selects the businessman's phone number displayed on the media card interface. In another example, the media card when viewed on a laptop comprising an email program provides the functionality of automatically launching a new email addressed to the businessman when the recipient selects the businessman's email address displayed on the media card interface.

Figure 5:
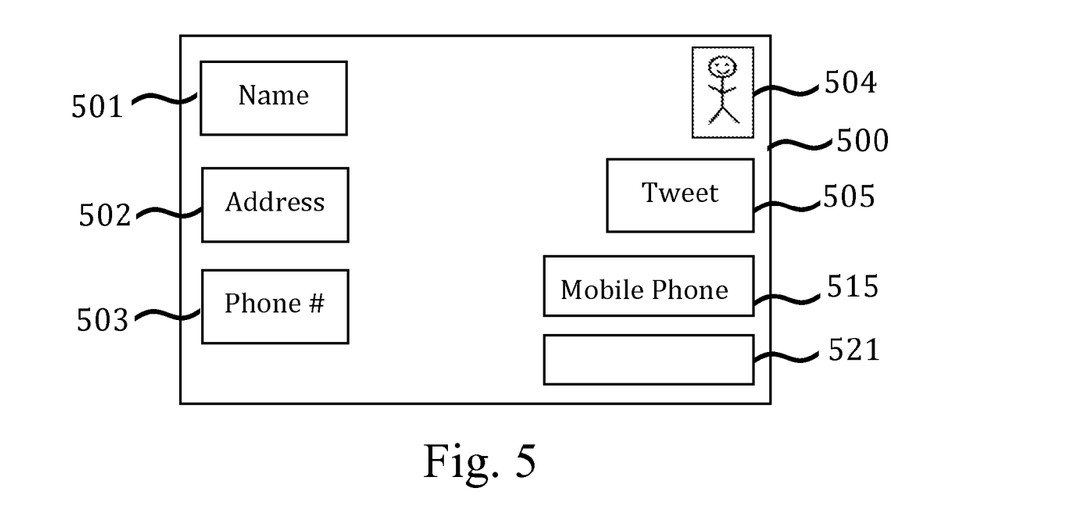
FIG. 5 illustrates a business colleague media card.

According to the above embodiment, a plurality of media cards are defined for a plurality of recipients. For a known recipient, a subset of data from the entity capsule data is selected to be accessible by the recipient. Shown in FIG. 5, is second media card 500 for recipients in the form of business colleagues, comprising the same data selected for media card 400 as well as new data comprising publications 306, Facebook® business profile 309, LinkedIn® profile 310, Plaxo contacts 311, MobileMe® contacts 312, business email 314, and mobile phone number 315. A business colleague views the second media card on a laptop or other computer and sees businessman's name 501, address 502, phone number 503, photo 504, latest Twitter® tweet 505, mobile phone number 515 and search box 521. The client types "contacts" into the search box 521. Data selected for media card 500 is searched for data relating to the keyword "contacts." Data is retrieved from contact management sources LinkedIn®, Plaxo® and MobileMe® and is displayed on the media card interface. Next, the business colleague types, "November tweet" into search box 521. The businessman's twitter account is searched for tweets distributed in November. Relevant tweets are displayed on the media card interface. In this example, business colleagues have access to information that is not accessible by clients. For example, business colleagues have the businessman's mobile phone number 515 and can search the businessman's emails 514. Optionally, data from contact management sources are searched.

Optionally, a media card is forwarded in an email. Optionally a media card is viewed on a mobile device; in such an instance, the media card is preferably formatted for the mobile device. Alternatively the media card is viewed within an email. Alternatively, selecting a media card icon launches the media card on a website. Alternatively, the media card is embedded in an online document accessible via a web link. Alternatively, related data resulting from a data search is displayed other than in the media card interface. Further alternatively, related data resulting from a data search is displayed in a new window. Alternatively, keywords are typed into other than the media card interface. Further alternatively, keywords are typed into a webpage. Yet further alternatively, keywords are highlighted when the recipient's mouse hovers over a keyword and searched for when the keyword is selected.

Figure 6:
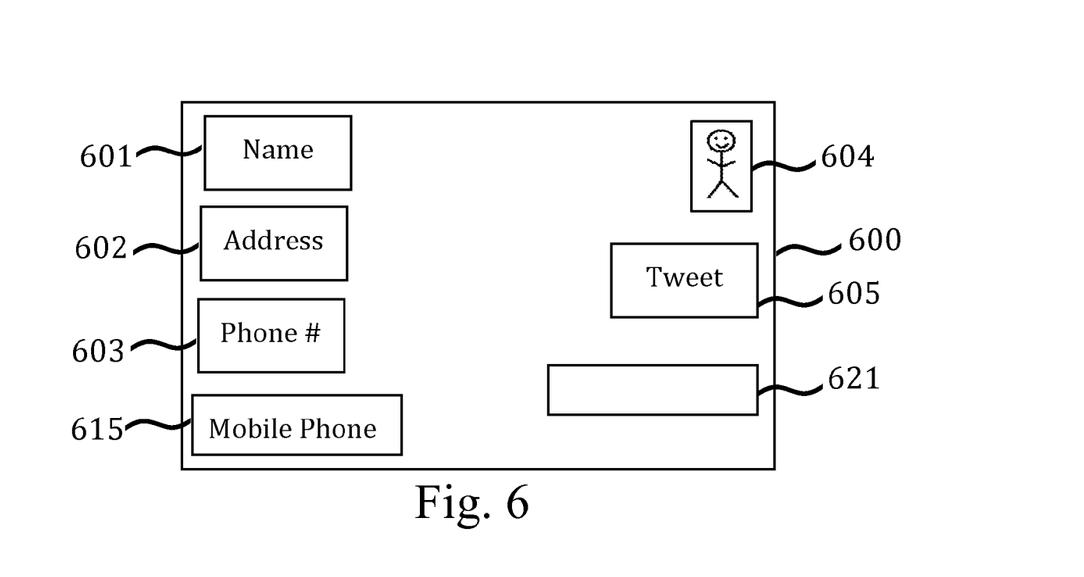
FIG. 6 illustrates a personal media card.

A third media card in the form of a personal media card 600 is illustrated in FIG. 6. The businessman wishes to share his personal information with friends and he selects from data capsule 300 his name 601, address 602, phone number 603, photo 604, latest Twitter® tweet 605, mobile phone number 615, blogs 307, Facebook personal profile 308 and Twitter® account 316 to be viewed and accessed via media card 600. He thinks his family would not be interested in the professional data stored in capsule 300, and does not select publications 306, a link to the businessman's Facebook® business profile 309, a link to the businessman's LinkedIn® account 310, Plaxo® contacts 311, MobileMe® contacts 312, and business email 314. The businessman emails a friend, Bob, and attaches media card 600. Bob receives the email and selects the media card icon embedded in the email and opens it by double clicking on the media icon. The media card interface shows his name 601, address 602, phone number 603, photo 604, latest Twitter® tweet 605, mobile phone number 615 and search box 621. Bob wants to read about the businessman's holiday in Paris and types the keyword "Paris" in search box 621. Data selected for media card 600 is searched for data relating to the keyword "Paris." Pictures from Facebook personal profile 308, information for blogs 307, and tweets relating to the keyword Paris is retrieved and displayed. If Bob's company also has an office in Paris, it is possible that information about the Paris office would also be returned given that Bob included his business' public profile in the capsule. The above examples illustrate that one entity's capsule is associated with a plurality of media cards. An entity can consolidate self-related information within one capsule and can distribute portions of this information based on relevance to a recipient.

According to an embodiment of the invention a media card is updated when associated capsule data is modified. For example, capsule 200 Twitter® link 205 was selected for a client's media card 100. The client opens media card 100 and the most recent twitter feed is retrieved from the businessman's Twitter account. The tweet is displayed on the media card interface and reads, "We are pleased to announce the new Manager of R&D, Ms. Jane Smith." The following day the client re-opens the same instance of media card 100 and again the most recent twitter feed is retrieved from the businessman's Twitter account. The tweet is displayed on the media card interface and reads, "Product introduction countdown—2 days." When a media card is opened the most recent capsule data selected for the media card is retrieved and accessible by the recipient and, in this example, it is displayed. Alternatively, media cards are other than updated automatically. Further alternatively, media cards are updated at the recipient's discretion. Optionally, the media card is updated when the recipient selects an update feature on the media card interface. As such, Media cards when static act like business cards and maintain a history of data relating to when they were created or first viewed. Alternatively, dynamically updated media cards allow an entity to provide a current and updated media card to a recipient that will always be as current and updated when viewed if the entity maintains the data therein.

Figure 7:
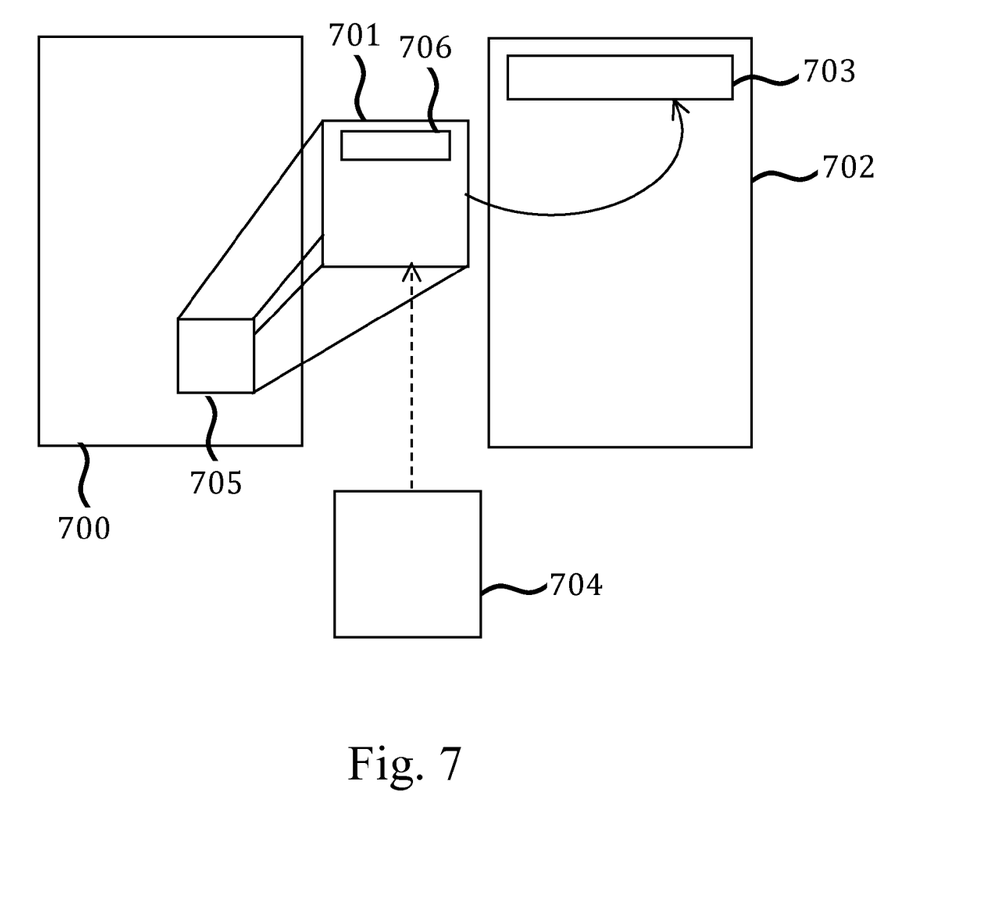
FIG. 7 illustrates a search engine searching for data associated with a media card.

According to an embodiment of the invention, a media card is used as search criteria for a search engine. Shown in FIG. 7 is a media card of a contractor attached to email 700 in the form of a media card 701. Alternatively media card 701 forms part of email 700. The contractor emailed media card 701 to a customer, for example, in an effort to gain new business. The customer opens media card 701 by selecting the media card icon 705 embedded in email 700. The customer types a keyword for example, "customers," into the search box 706 to determine who has used the contractor's services before. When the customer has completed searching within media card 701, he decides to perform a general search for information pertaining to the contractor on the Internet. He opens a web browser and a search engine, in the form of Google® 702, and instead of typing keywords into Google's® search box 703, he drags media card 701 to the search box 703. Google® searches the Internet for data associated with media card 701 and displays search results. For example, the contractor's LinkedIn page 704 contains a list of his contacts, including John Smith. John's name is within or associated with the media card 701. Information associated with John and the contractor's media card 701 is searched for on the Internet, and once found is displayed, including a link to a community charity website where both John and the contractor are listed as members. The customer is happy knowing that the contractor is charitable and invests time and energy into helping the community. Next the customer would like to search for information relating to masons with whom the contractor is in contact. Adding the word "mason" to Google's search box 703, along with media card 701, the Google® search engine searches for data relating to masons referenced in media card 701 or associated therewith on the Internet. Search results are displayed comprising URLs to masons websites, review blogs of the masons, and so forth wherein the masons are related to media card 701. Alternatively, the masons' relation to media card 701 is determined based on operators provided with the media card, such as Boolean operators. Next the customer would like to search for information relating to plumbers with whom the contractor is in contact. However, there is a plumbing company, The Plumbing Co., that the customer has employed before which he does not wish to employ again, even if the contractor has referenced the company in media card 701. Using a Boolean operator to indicate that search results other than include The Plumbing Co., for example adding,—"The Plumbing Co." or NOT "The Plumbing Co." in Google's® search box 703, along with the word "plumber" to Google's search box 703 and media card 701, and the Google® search engine searches for data relating to plumbers referenced in media card 701, other than The Plumbing Co., on the Internet. Search results are displayed comprising URLs to plumbers' websites, review blogs of the plumbers, and so forth.

Alternatively, a Boolean operator is applied to the media card wherein search results comprise data other than capsule data. Alternatively, the media card's URL is entered into the search engine search box. Further alternatively, the media card icon is dragged and dropped into the search engine search box. Alternatively, the search engine searches data stored within an Intranet. Further alternatively, the search engine searches a single host computer. Further alternatively, the search engine searches a data store.

Alternatively, the recipient initiates using the media card as search criteria of a search engine via a recipient selectable feature provided on the media card interface. For example, the media card interface comprises a list of search engines the recipient can select and a text box for entering further search criteria. In contrast to the example described above, media card 701 is not dragged into Google's search box, instead the customer selects a search engine from the list provided on the media card's interface, for example Google®, and search criteria data is provided to the Google® search engine. Optionally, the customer enters further search criteria into the media card interface text box provided. For example, the contractor's LinkedIn® page 704 contains a list of his contacts, including John Smith. John's name is within or associated with the media card 701, thus John's name is search criteria of the Google® search of the Internet. Information associated with John and the contractor's media card 701 is searched for on the Internet, and once found is displayed, including a link to a community charity website where both John and the contractor are listed as members. The customer is happy knowing that the contractor is charitable and invests time and energy into helping the community. Next the customer would like to search for information relating to masons with whom the contractor is in contact. Adding the word "mason" to media card interface text box, the Google® search of the Internet searches for data relating to masons referenced in media card 701 or associated therewith. Search results are displayed comprising URLs to masons websites, review blogs of the masons, and so forth wherein the masons are related to media card 701. Alternatively, the masons' relation to media card 701 is determined based on operators provided with the media card, such as Boolean operators. Next the customer would like to search for information relating to plumbers with whom the contractor is in contact. However, there is a plumbing company, The Plumbing Co., that the customer has employed before which he does not wish to employ again, even if the contractor has referenced the company in media card 701. Using a Boolean operator to indicate that search results other than include The Plumbing Co., for example adding,—"The Plumbing Co." or NOT "The Plumbing Co." along with the word "plumber" to the media card interface text box the Google® search of the internet searches for data relating to plumbers referenced in media card 701, other than The Plumbing Co. Search results are displayed comprise URLs to plumbers' websites, review blogs of the plumbers, and so forth. Optionally the search engine is any one of a desktop search engine, Yahoo®, Safari®, an Internet search engine, and an intranet search engine. Alternatively, a Boolean operator is applied to the media card wherein search results comprise data other than capsule data. Alternatively, the search engine searches data stored within an intranet. Further alternatively, the search engine searches a single host computer. Even further alternatively, the search engine searches a data store.

Figure 8:
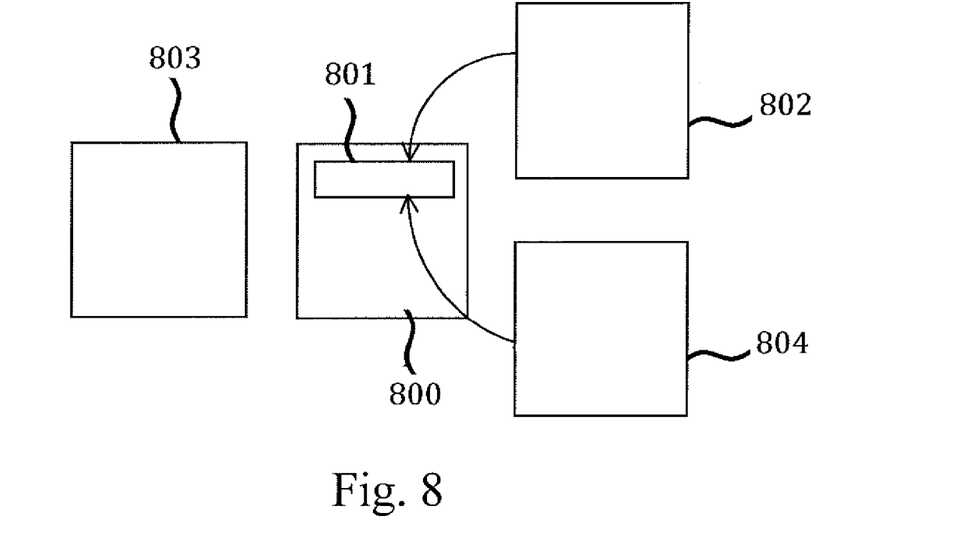
FIG. 8 illustrates a second media card searching for data associated with a first media card.

According to an embodiment of the invention a first media card is used as search criteria for searching capsule data associated with a second media card. Referring to FIG. 8 shown is capsule 803 and associated second media card in the form of a musician's media card 800 comprising search box 801. The musician is in the process of selecting band members for his new band and has received from a drummer a first media card in the form of media card 802. The musician prefers to hire like-minded people and would like to determine any commonality between the drummer and himself. He selects and drags media card 802 into search box 801. Capsule 803 data is searched for data associated with media card 802. The search results are displayed and comprise venues that both the musician and drummer have played, contacts that they have in common, music they both like, email lists they both subscribe to, and so forth. Optionally the search results comprises a video demo of the drummer that the musician can view. Alternatively, the first media card's URL is entered into the second media card's search box. Further alternatively, the first media card is dragged and dropped into the second media card's search box.

Figure 9:
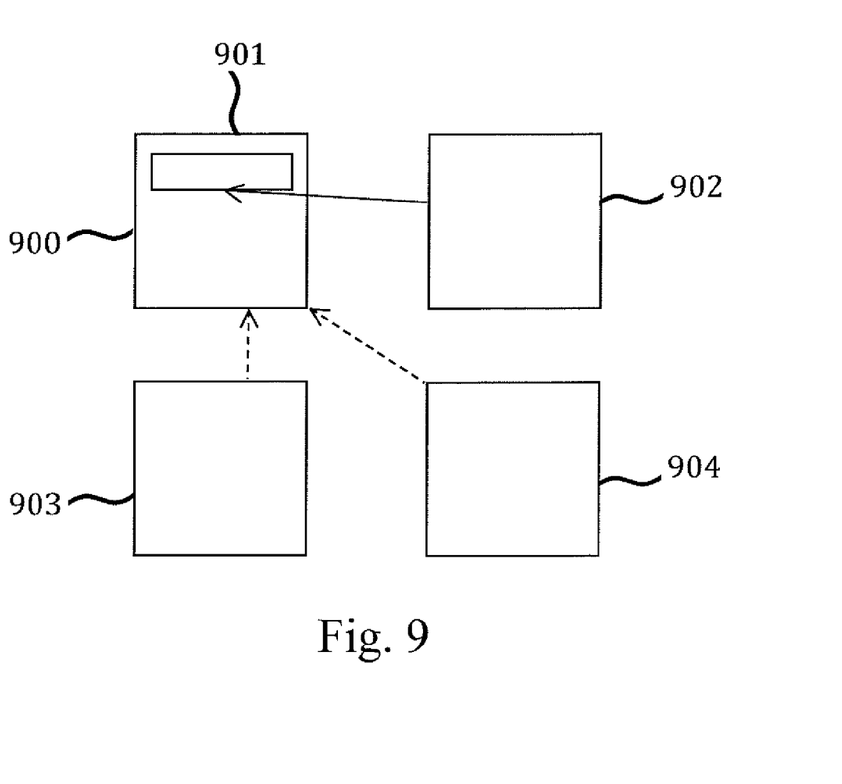
FIG. 9 illustrates a second media card searching for data associated with a first media card and data stores.

According to another embodiment of the invention a first media card is used as search criteria for searching capsule data associated with a second media card and within a recipient specified data store. Referring to FIG. 9 shown is a second media card in the form of an executive's media card 900, comprising search box 901 and the executive's capsule 903 data associated with media card 900. The executive is in the process of hiring a new salesman and has received a first media card in the form of media card 902 from a potential candidate. The executive has previously worked with many people, companies and distributors in industry, and he is interested to know if his path has crossed with that of the candidate before. He selects and drags media card 902 into search box 901. Media card 900 provides a menu for selecting data stores to be searched, within which he selects his email mailbox 904, which is not associated with capsule 903. The search results are displayed and comprise media card 900 data that is associated with capsule 903 data and media card 900 data that is associated with email mailbox 904. For example the results comprise people that are listed as contacts in both media card 900 and email mailbox 904. The executive takes note of the contacts that he wishes to contact to learn more about the candidate. Also listed in the results are emails that the executive had received from the candidate many months ago that the executive had forgotten he received. This jogs his memory and the executive realizes that he in fact had met the candidate when the candidate was a sales representative for another company. Of course, when the executive's staff's emails are within a scope of the executive's data, the results may highlight interactions with the company that the executive was not privy to, which may affect any decision to be made.

Alternatively, the first media card's URL is entered into the second media card's search box. Further alternatively, the first media card icon is dragged and dropped into the second media card's search box. Optionally, the data store is available via an intranet. Further alternatively the data store is a computer. Further alternatively, the data is accessible via the Internet. Alternatively, the second media card is launched on a website. Alternatively, the first media card is embedded in an online document accessible via a web link. Alternatively, related data resulting from a data search is displayed other than in the second media card interface. Further alternatively, related data resulting from a data search is displayed in a new window. Alternatively, keywords are typed into other than the second media card's interface. Further alternatively, keywords are typed into a webpage.

According to an embodiment of the invention a Boolean operator applied to a third media card is used as search criteria for searching capsule data associated with a second media card. Referring still to FIG. 8 shown is a third media card in the form of a 'Music Instruments' media card 804. The musician described above is in the process of purchasing new instruments and wishes to make a purchase. Unfortunately, in the past, a specific part of his instrument has been inadequate. He knows the manufacturer is Music Instruments who is known for manufacturing said part for many years. In order to find distributors of instruments not having those parts, the musician opens Music Instruments' media card 804. He adds the Boolean operator "not" to the search box 801. Next he selects and drags media card 804 into search box 801 and adds the keyword "instruments". Alternatively, he opens a search interface and adds the media card and the operator thereto. The search space is searched for data associated with instruments not having parts from Music Instruments. The search results are displayed and comprise emails and brochures that meet the search criteria. Optionally, the search space is within the musician's capsule. For example, the third media card's URL is entered into the second media card's search box. Alternatively, the third media card icon is dragged and dropped into the into the second media card's search box. Alternatively, the second media card is launched on a website. Alternatively, the third media card is embedded in an online document accessible via a web link. Alternatively, related data resulting from a data search is displayed other than in the second media card's interface. Further alternatively, related data resulting from a data search is displayed in a new window. Alternatively, keywords are typed into other than the second media card's interface. Further alternatively, keywords are typed into a webpage.

Numerous other embodiments may be envisaged with out departing from the scope of the invention.

The invention claimed is:

1. A method comprising:
storing first data on a first server, the first data comprising a first media card, the first media card when displayed via a display portion of a computer providing a visual representation of a subset of data within a capsule associated with a first individual for distribution of data from within the capsule;
transmitting via a communication network from the first server the first data to an input port of a search engine, the first data provided as search criteria for the search engine;
receiving the first data via the input port by the search engine;
using the search engine, searching within second data different than the first data, for first result data based on the first data and relating directly to the first individual; and
displaying, via a display portion of a first computer, search results based on the first result data.

2. The method according to claim 1 wherein the search engine is in execution on the first computer.

3. The method according to claim 1 wherein the search engine is in execution on the first server in communication with the first computer.

4. The method according to claim 1 wherein the search engine is in execution on a second server in communication with the first computer and wherein the second data comprises a user specified data store comprising capsule data associated uniquely with a second individual.

5. The method according to claim 1 wherein the search engine is in execution on a second server in communication with the first computer and wherein the second data comprises capsule data comprising a plurality of user specified data stores associated uniquely with a second individual.

6. The method according to claim 4 wherein the second data comprises a data store accessed via the Internet.

7. The method according to claim 1 wherein the search engine comprises an Internet search engine.

8. The method according to claim 1 wherein the search criteria further comprises a Boolean operation.

9. The method according to claim 8 wherein the first result data is based on the first data and the Boolean operation applied to the first data.

10. The method according to claim 1 wherein the search criteria further comprises a keyword.

11. The method according to claim 10 wherein the first result data is based on the first data and the keyword.

12. The method according to claim 10 wherein the first result data is based on the first data and the Boolean operation applied to the keyword.

13. A method comprising:
providing a search engine in execution on a first computer for searching within first data for result data;
receiving, by the search engine, criteria data comprising first media card data comprising a subset of data from within a capsule including digital data and for use in distribution of data from within the capsule;
searching, by the search engine, for the result data associated with the criteria data within the first data, the result data associated with at least some data within the first media card to provide search results; and
displaying the search results on a user interface, the search results relating directly to the individual.

14. A method according to claim 13 wherein criteria data comprises a Boolean operator applied to the first media card data.

15. The method according to claim 13 wherein the first data comprises a user specified data store.

16. A method comprising:
providing a search engine in execution on a first computer for searching data within a user specified data store for result data, the user specified data store comprising first media card data comprising a subset of data within a first capsule for use in distribution of data from within the first capsule to the first user, the first capsule other than publically available;

receiving, via a first media card interface, criteria data comprising second media card data comprising a subset of data within a second capsule for use in distribution of data from within the second capsule;

searching by the search engine for result data associated with the criteria data within the user specified data store, the result data associated with at least the first media card data to provide search results; and displaying the search results on a user interface.

17. A method according to claim 16 wherein the criteria data comprises a Boolean operator applied to the first media card data.

18. The method according to claim 16 wherein the user specified data store comprises first capsule data associated with the first media card data.

19. The method according to claim 16 wherein the user specified data store comprises a data store accessed via the Internet.

20. The method according to claim 16 wherein the user specified data store comprises a computer.

21. The method according to claim 16 wherein the criteria data comprises a keyword.

22. The method according to claim 21 wherein the criteria data comprises a Boolean operation applied to the keyword.

23. The method according to claim 16 wherein the search engine comprises a desktop search engine for searching local data.

24. The method according to claim 16 wherein the search engine comprises an Internet search engine.

25. The method according to claim 16 wherein the criteria data comprises a third media card.

* * * * *